United States Patent [19]

Mattedi et al.

[11] Patent Number: 4,562,553

[45] Date of Patent: Dec. 31, 1985

[54] FLOATING POINT ARITHMETIC SYSTEM AND METHOD WITH ROUNDING ANTICIPATION

[75] Inventors: Bruno A. Mattedi, Andover; Hiromichi Watari, Somerville, both of Mass.

[73] Assignee: Analogic Corporation, Wakefield, Mass.

[21] Appl. No.: 591,199

[22] Filed: Mar. 19, 1984
(Under 37 CFR 1.47)

[51] Int. Cl.[4] .............................................. G06F 7/50
[52] U.S. Cl. .................................... 364/745; 364/748
[58] Field of Search ............................... 364/745, 748

[56] References Cited

U.S. PATENT DOCUMENTS

| | | | |
|---|---|---|---|
| 3,842,250 | 10/1974 | Anderson | 364/745 |
| 4,295,203 | 10/1981 | Joyce | 364/748 |
| 4,338,675 | 7/1982 | Palmer et al. | 364/748 |
| 4,442,498 | 4/1984 | Rosen | 364/745 |
| 4,468,748 | 8/1984 | Blav et al. | 364/748 |

Primary Examiner—David H. Malzahn
Attorney, Agent, or Firm—Joseph S. Iandiorio; William E. Noonan

[57] ABSTRACT

A floating point arithmetic system with rounding anticipation including an arithmetic unit for arithmetically combining two mantissas; a carry circuit for determining whether the sum will overflow upon the addition of two mantissas and whether the difference will have a leading zero upon the subtraction of two mantissas; the subtrahend in subtraction and the augend in addition include guard, round, and sticky digits; a rounding circuit is responsive to the carry circuit for rounding the least significant digit of the sum when the sum will overflow and for designating for rounding the guard digit of the sum when the sum will not overflow, for designating for rounding the round digit of the difference when the difference will have a leading zero, and for designating for rounding the guard digit of the difference when the difference will not have a leading zero; and means for introducing to the arithmetic unit at the designated digit during the arithmetic combining of the two mantissas an amount equal to one-half the radix to effect the rounding during the arithmetic operation.

10 Claims, 4 Drawing Figures

FLOATING POINT ARITHMETIC SYSTEM AND METHOD WITH ROUNDING ANTICIPATION

FIELD OF INVENTION

This invention relates to an improved high speed floating point arithmetic system, and more particularly to such a system which anticipates rounding and accomplishes it simultaneously with the addition of the mantissas.

BACKGROUND OF INVENTION

In conventional floating point arithmetic systems, numbers are represented with an exponent and a fraction which is called the mantissa. The mantissa is always between the radix and one over the radix. For example, if the radix is 10, the mantissa would be between 0.1 and 1.0. If the radix is 2, the mantissa would be between 0.5 and 1.0. When addition or subtraction is performed, the exponents are first compared. If they are the same, then the addition or subtraction can proceed immediately. If they are different, the mantissa of the number with the smaller exponent must be down-shifted (shifted to the right) and one or more leading zeros inserted until the two exponents are the same. Then addition can proceed. Subtraction is often done by complementing the subtrahend and then performing addition. Conventional floating point systems utilize a four-step procedure. The first step is to align the two mantissas, that is, compare the magnitude of the exponents and then shift the smaller mantissa to the right the number of places required to make the exponent of the smaller number equal to the exponent of the larger number. In the second step, the two numbers, the addend and the augend, are added together to get the sum or, in subtraction, the subtrahend is subtracted from the minuend to obtain the difference. The mantissa which is a subtrahend or augend is generally accompanied by three additional digits, the guard digit, the round digit and the sticky digit which are used for purposes of rounding when the mantissa is shifted. In some techniques, subtraction is accomplished by complementing the subtrahend and then adding the subtrahend and minuend. The third step is normalization. If, during addition, the mantissa overflows it will be shifted to the right and the exponent will be raised 1 power. If there is no overflow, no shifting is required. In subtraction, if the difference has one or more leading zeroes then the mantissa must be shifted to the left and the exponent decremented by the number of leading zeroes. In either the overflowed addition operation or the subtraction operation that ended with leading zeroes, a decision has then to be made. In the fourth step, the normalized result is rounded. In the addition overflow situation, the least significant digit is rounded. If there is no overflow, the guard digit is rounded. In a subtraction operation where there results a leading zero in the difference, the round digit is rounded and, when there is no leading zero, the guard digit is rounded. This approach requires a second addition operation which may result in a second normalization.

SUMMARY OF INVENTION

It is therefore an object of this invention to provide an improved, floating point arithmetic system.

It is a further object of this invention to provide such a system which is faster than conventional systems.

It is a further object of this invention to provide such a system which uses fewer steps to accomplish an arithmetic operation.

It is a further object of this invention to provide such a system which anticipates whether or not and at which digit rounding is required and effects the rounding simultaneously with the arithmetic operation.

It is a further object of this invention to provide such a system which requires fewer components and is less expensive.

The invention features a floating point arithmetic system with rounding anticipation. An arithmetic unit is used for arithmetically combining two mantissas. The carry circuit determines whether the sum will overflow upon the addition of the two mantissas and whether the addition will have a leading zero upon the subtraction of the two mantissas. The subtrahend, in subtraction, and the augend, in addition, include guard, round and sticky digits. A rounding circuit is responsive to the carry circuit for rounding the least significant digit of the sum when the sum will overflow and for rounding the guard digit of the sum when the sum will not overflow. The rounding circuit also designates for rounding the round digit of the difference when the difference will have a leading zero and designates for rounding the guard digit of the difference when the difference will not have a leading zero. There are means for introducing to the arithmetic unit at the designated digit, during the arithmetic combining of the two mantissas, an amount equal to one-half the radix to effect the rounding during the arithmetic operation.

In a preferred embodiment, the arithmetic unit includes adder means for performing adding and subtracting operations. The carry circuit includes a carry generating/propagating bridge for anticipatorily determining whether the difference will have a leading zero when the most significant digit of the subtrahend mantissa has a leading zero. The rounding anticipation adder may include means for setting the most significant digit of the subtrahend mantissa to 1, complementing the subtrahend, adding a 1 to the least significant digit and adding the two mantissas. The rounding circuit may also include a round determination circuit for determining whether the guard, round and sticky digits are greater than one-half the radix. An anticipation addition rounding circuit places one-half of the radix into the least significant digit of the arithmetic unit if an overflow will occur and adds one-half the radix to the guard digit if an overflow will not occur. An anticipation subtraction rounding circuit subtracts one-half of the radix from the guard digit if there is no leading zero in the difference and subtracts one-half of the radix from the round digit if there is a leading zero in the difference. The means for introducing the half-radix to the arithmetic unit at the designated digit during the arithmetic combining of the two mantissas may include a guard digit adder circuit and a round digit adder circuit.

The invention also features a method of rounding anticipation for a floating point arithmetic system including determining whether the sum will overflow upon the addition of two mantissas and determining whether the difference between two mantissas will have a leading zero upon the subtraction of the two mantissas. The least significant digit of the sum is designated for rounding when the sum will overflow. The guard digit of the sum is designated for rounding when the sum will not overflow. The round digit of the difference is designated for rounding when the difference will have a leading zero and the guard digit of the difference is designated for rounding when the difference will not have a leading zero. An amount equal to one-half of the radix is introduced to the arithmetic unit at the designated digit during the arithmetic combining of the two mantissas to effect the rounding during the arithmetic operation.

DISCLOSURE OF PREFERRED EMBODIMENT

Other objects, features and advantages will occur from the following description of a preferred embodiment and the accompanying drawings, in which.

Figure 1:
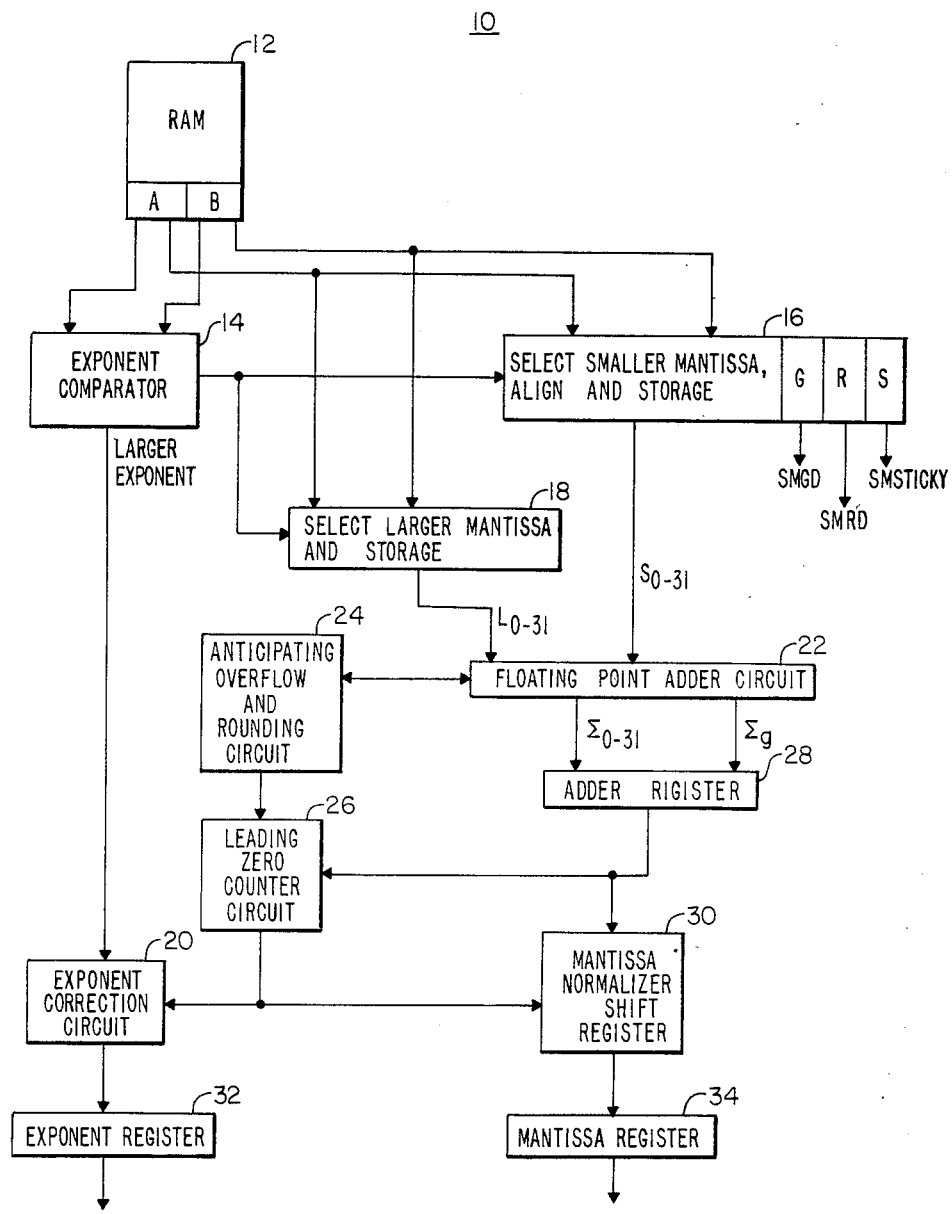
FIG. 1 is a block diagram of a floating point pipeline circuit with a floating point arithmetic system according to this invention.

There is shown in FIG. 1, a floating point arithmetic pipeline circuit or unit 10 including a random access memory 12 in which is stored two sets of numbers, A and B, each number in the set including an exponent and a mantissa. The exponents from each number, $A_i$ and $B_i$, are provided to exponent comparator circuit 14 and the mantissas of numbers $A_i$ and $B_i$ are provided to both select smaller mantissa align and store circuit 16 and select larger mantissa and store circuit 18. Exponent comparator circuit 14 determines which of the exponents is the larger one and directs the mantissa for that exponent to storage 18 and the mantissa of the smaller exponent number to storage 16. At that point the guard, round, and sticky bits are added to the 32-bit mantissa. At the same time, the larger exponent is provided to exponent correction circuit 20. In those cases in which the mantissas and the exponents are exactly equal, (that is, there is no smaller or larger number), one of the numbers, such as the B number, may automatically be designated the smaller and the other, the larger. When the number selected reaches storage 16, it is aligned by being shifted the number of spaces determined by the difference in the exponents for the two numbers. The larger mantissa is stored without shifting in storage 18. The two mantissas are then supplied from storages 16 and 18 to the floating point adder circuit 22 according to this invention. Anticipating overflow and rounding circuit 24 immediately determines whether or not rounding is required and at what digit it is required and introduces the proper amount to adder 22 while the arithmetic operation is proceeding, so that the rounding and the addition or subtraction occur simultaneously. The arithmetic combining of the mantissas in adder 22 may be an addition operation, a subtraction operation or a subtraction operation performed by first complementing the subtrahend and then performing an addition operation. The number of leading zeros in the difference from the subtraction operation is provided to leading zero counter circuit 26. The difference or sum $\Sigma_{0-31}$, $\Sigma g$ is provided to the adder register 28. The symbol $\Sigma_{0-31}$ represents that the mantissas contain 32 bits: digit 31 is the sign digit, digit 30 is the most significant digit and digit 0 is the least significant digit. $\Sigma g$ is the guard digit of the sum difference. The output of adder register 28 is delivered to the mantissa normalizer shift register 30 and to leading zero counter circuit 26. Leading zero counter circuit 26 determines from anticipating overflow and rounding circuit 24 whether or not the operation has resulted in an overflow. If it has, it will disregard the apparent leading zeros it determines from the input from adder register 28 and will down-shift the mantissa and insert a leading one and increment the exponent. If there has not been an overflow, then the leading zeros are counted and are used to shift the mantissa to the left at shift register 30 and simultaneously decrement the exponent in exponent correction circuit 20. The final exponent is provided in exponent register 32 and the final mantissa is provided in mantissa register 34. Although thus far the disclosure has been in terms of radix and the ancillary positions have been referred to as the guard digit, round digit and sticky digit, these are general terms. When utilized in a binary system, the radix is 2 and the digits are normally referred to as bits such as guard bit, round bit and sticky bit.

Figure 2:
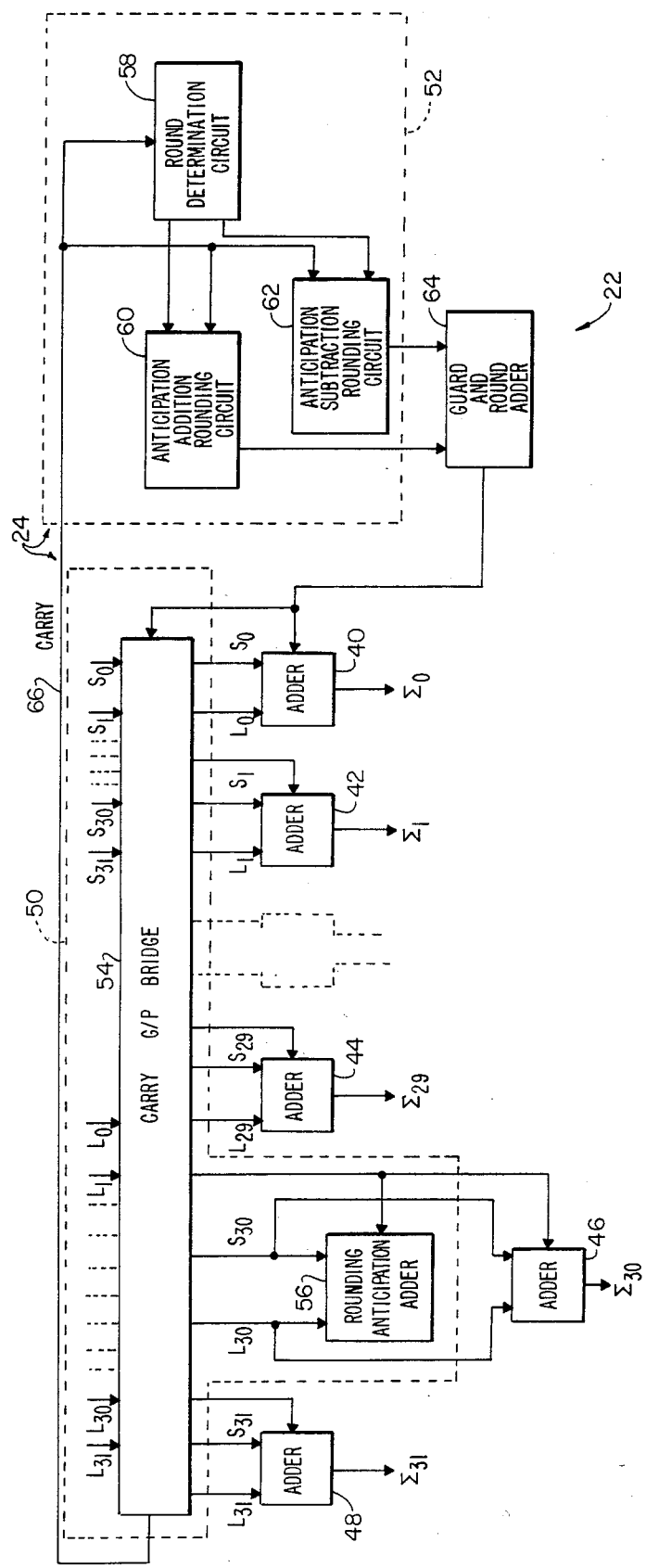
FIG. 2 is a more detailed block diagram of the floating point adder and anticipating overflow and rounding circuit of FIG. 1.

Floating point adder circuit 22 and anticipating overflow and rounding circuit 24 are shown in greater detail in FIG. 2. Floating point adder circuit 22 includes 32 adders, one for each of the 32 bits of the mantissa, a few of which adders 40, 42, 44, 46 and 48 are shown. Anticipating overflow and rounding circuit 24 includes carry circuit 50 and rounding circuit 52. Carry circuit 50 includes a carry generate/carry propagate bridge 54 and rounding anticipation adder 56. The 32 bits, $L_{0-31}$, from the larger mantissa stage 18 and the 32 bits, $S_{0-31}$, from the smaller mantissa stage 16 are sent to carry generate/propagate bridge 54 which is a fast carry bridge that can determine whether or not there will be a carry or an overflow even before the addition or other arithmetic processes are carried out by adders 40–48. The inputs are delivered to each adder in pairs $S_0$, $L_0$, $S_1$, $L_1$, and so on; the carries are generated in bridge 54 and resubmitted to each adder in succession. The differences or the sums $_{0-31}$ are then delivered to adder register 28, FIG. 1. The extra adder, rounding anticipation adder 56, determines whether or not there will be a leading zero in the difference of a subtraction operation and may be used to determine overflow in addition operations. Rounding circuit 52 includes a round determination circuit 58, anticipation addition rounding circuit 60 and anticipation subtraction rounding circuit 62 which provide inputs to the guard/round adder 64 portion of adder circuit 22. A carry from bridge 54 is delivered on line 66 to each of circuits 58, 60 and 62. Round determination circuit 58 determines whether the guard, round, and sticky digits are greater than one-half the radix. Anticipation addition rounding circuit 60 places one-half of the radix into the least significant digit of the arithmetic unit if an overflow will occur and adds one-half of the radix to the guard digit if an overflow will not occur. Anticipation of the subtraction rounding circuit 62 subtracts one-half of the radix from the guard digit if there is no leading zero in the difference and subtracts one-half of a radix from the round digit if there is a leading zero in the difference.

Addition and subtraction in the system involves three steps: alignment of the smaller value to match the larger, that is there is an increase in the number of leading zeros in the smaller fraction and an increase in the exponent by a similar amount until the exponents are equal; then performing the addition or subtraction operation; and finally normalizing the result by stripping the leading zeros from the mantissa and decrementing the exponent accordingly. The significant digits are limited to some number, in this particular embodiment 32, and there are three extra digits involved below the least significant digit, the guard, the round and the sticky digit or bit.

The operation of the system can be better understood from an explanation of the addition and the subtraction modes. In the addition of the two fractions, one can anticipate that the sum of the two will either be greater than one or less than one. If the sum is greater than one, there must be a down shift of the resulting mantissa by one digit and an incrementing of the exponent accordingly. The least significant digit will be discarded and the next least significant digit will be rounded accordingly. If the result is less than one, all the digits lower than the least significant digit are discarded and the least significant digit is rounded accordingly.

Subtraction is slightly more complex. There are three cases. In the first, the exponents are equal. That is, neither fraction after alignment will have leading zeros. In the second case, the exponents differ by one. That is, the smaller fraction has a leading zero after alignment has been accomplished. In case three, the exponents differ by two or more.

In case one, since there is no alignment required, the three extra digit positions below the least significant digit, guard, round and sticky, are zero. The result may have at least one leading zero and in binary it will have at least one leading zero. Nevertheless, there will be no significant digits discarded, therefore there will be no rounding required.

In case two, the guard digit is the only digit position of the result which may contain a significant digit because of the shifting down in alignment. If the result has no leading zero, the guard digit will be discarded and the least significant digit will be rounded accordingly. However, if the result has a leading zero, the guard digit is retained when the mantissa is shifted up and the leading zero discarded. Therefore, there is no rounding.

In case three, the guard and the round digit positions may contain a significant digit, but the result will have, at most, one leading zero. If the result has no leading zeros, the guard and round digits or bits will be discarded and the least significant bit will be rounded accordingly. If the result has one leading zero, only the round digit is discarded and the guard digit is rounded accordingly and retained.

In this invention, the rounding is accomplished during the add/subtract operation without the use of an additional adder, but with the increase in speed resulting in the elimination of a second step of addition by anticipating the overflow in rounding conditions. This invention determines whether the add or subtract of each digit pair will generate an overflow from the larger and smaller mantissa. It will generate or propagate a carry or a borrow using a series of carry generate/carry propogate bridges such as carry generate/propagate bridge 54 and the rounding anticipation adder 56. Then from the number of leading zeros in the smaller mantissa, one can determine which digit position of the result will be discarded and which one will then be rounded and where to insert the quantity, typically one-half radix, that will cause the carry/borrow to be generated if the digit is to be discarded.

In addition, if a carry occurs, the value is forced into the least significant digit position of the adder so that when it is added with the least significant digit of the two mantissas it will generate a carry into the next least significant digit position. For a binary adder, this requires forcing a carry of one into the least significant bit position. However, if the carry out of the most significant digit will not occur in the addition, then one of the inputs to the guard digit position of the adder is forced to a value which will generate a carry into the least significant digit position if the guard digit of the smallest value is of rounding magnitude. In a binary adder, this constitutes forcing the guard bit of the larger mantissa, normally zero, to become a one. After the single addition, the resulting sum is already rounded and at the proper position. The result is then simply truncated.

In subtraction, in the first case if the smaller mantissa has not been downshifted, that is there is no leading zero, then rounding is not required. In the second case, if the smaller mantissa has one leading zero, a borrow from the most significant digit of the larger may occur. Should a borrow not occur, the guard digit of the result is discarded. The value is then forced into the guard digit position of the larger mantissa which is normally a zero and which will generate a borrow into the least significant digit during the subtraction operation if the guard digit of the smaller mantissa is of sufficient magnitude. Should a borrow occur in the binary case, the result will have a leading zero and the guard bit of this result will be retained. Since the round digit of both mantissas is zero, there is no need to force a value into the round digit position of the larger mantissa.

In case three of the subtraction operation, if a borrow from the most significant digit of the larger mantissa occurs and will result in a leading zero in the difference, the round digit will be discarded. Thus the round digit position of the larger mantissa is forced to a value which will generate a borrow from the guard digit during the subtraction if the smaller mantissa's round digit is of sufficient magnitude. If a borrow does not occur, then both the guard and round digits are discarded after subtraction, since the most significant digit of the result will be non-zero. The guard digit position of the larger input mantissa is then forced to a value which will generate a borrow from the least significant digit during the subtraction if the smaller mantissa's guard digit is of sufficient magnitude.

Rounding anticipation adder 56 is provided with $L_{30}$, $S_{30}$, and the carry from the $L_{29}$, $S_{29}$ adder and function as a normal adder yielding a sum and a carry out. In a subtraction mode, however, adder 56 includes means for setting the most significant digit of the subtrahend ($S_{30}$) to one, complementing the subtrahend, and adding the two inputs. This provides, in case one of the subtraction where the most significant bit is one, the condition that a zero carry out indicates the most significant bit of the difference is one whereas when the carry is one, the most significant bit of the difference is zero. In subtraction cases 2 and 3, when the $S_{30}$ is zero, a carry of zero indicates a most significant bit of zero in the difference and a carry of one indicates a most significant bit of one in the difference.

Figure 3:
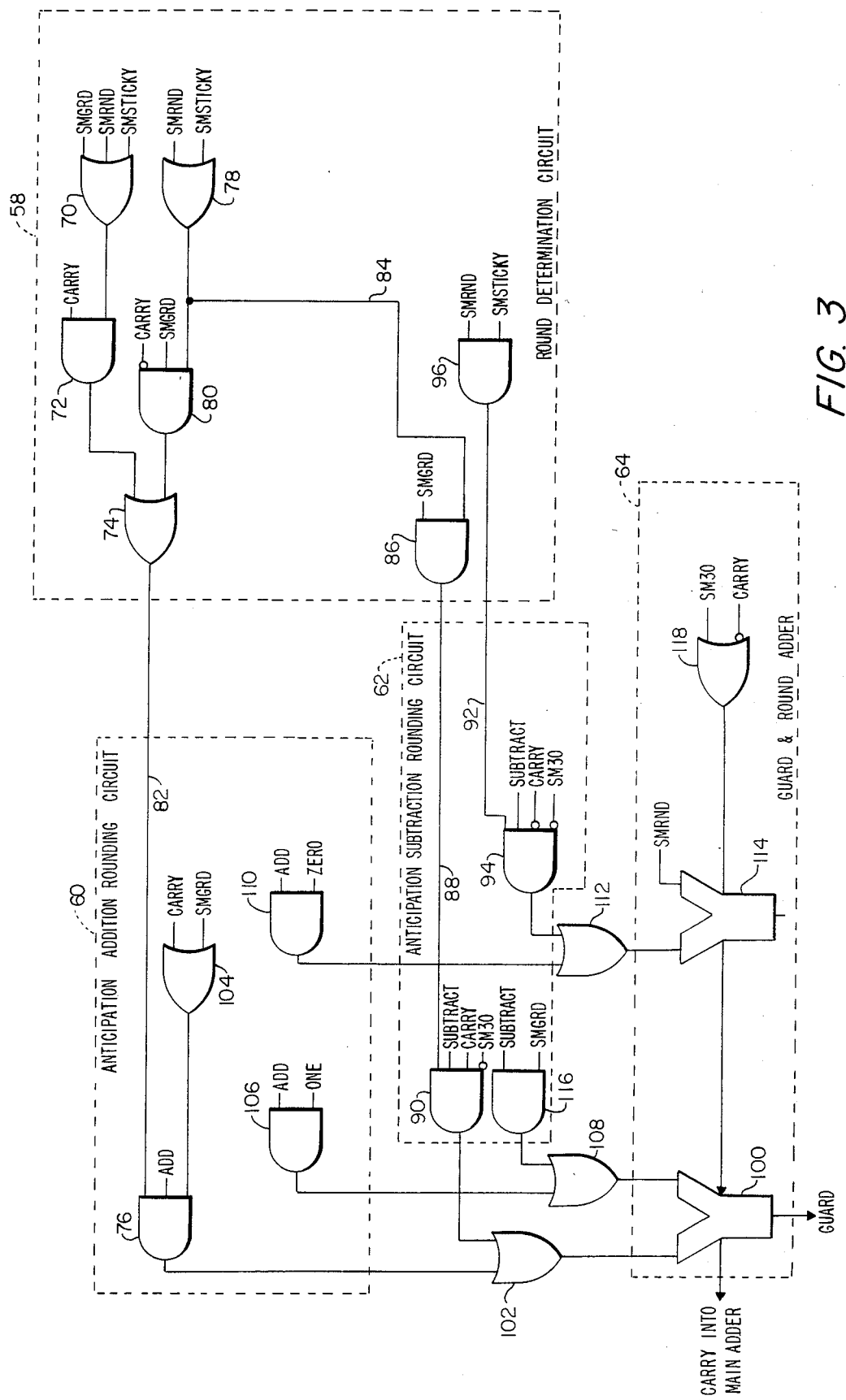
FIG. 3 is a more detailed diagram of the anticipation addition rounding circuit, anticipation subtraction rounding circuit, and round determination circuit of FIG. 2.

The guard, round, and sticky bits of the smaller mantissa SMGRD, SMRND, SM STICKY are provided to OR gate 70, FIG. 3. If any one of those is a binary one and carry is a binary one, then AND gate 72 will provide a one to OR gate 74 to AND gate 76. Alternatively, if either SMRND or SM STICKY is a binary one, that will be delivered through OR gate 78 to one input of AND gate 80. If the guard bit of the smaller mantissa SMGRD is one and the carry is zero, then a one will be provided through OR gate 74 to AND gate 76. An indication that either the round bit or the sticky bit SMRND, SM STICKY is a one at the input of OR gate 78 is delivered on line 84 to one input of AND gate 86. If the other input, the guard bit SMGRD, is a one then AND gate 86 will provide a one on line 88 to AND gate 90 in anticipation subtraction rounding circuit 62. A one will also be supplied on line 92 to AND gate 94 in circuit 62 if the guard and sticky bits SMGRD, SM STICKY are both one at the input to AND gate 96.

Therefore, anticipation addition rounding circuit 60, FIG. 3, will provide a one to one input of the guard adder 100 through OR gate 102 if the signal on line 82 is a one, the system is operating in the addition mode, and either the carry or guard bit SMGRD at the input of OR gate 104 is a one. If the system is in the addition mode, circuit 60 will also provide a second one to adder 100 from AND gate 106 through OR gate 108. At the same time, with the system in the addition mode a zero will be passed from AND gate 110 to OR gate 112 to the round adder 114. Guard adder 100, round adder 114 and their associated OR gates 102, 108 and 112 provide the means for introducing to the arithmetic unit at the designated digit an amount equal to one-half the radix during the combining of the two mantissas. In the binary system that amount is a one and affects the rounding simultaneously with the arithmetic operation. Adder 100 may also receive a one through OR gate 102 from AND gate 90 in circuit 62 if, with line 88 at one, the system is in the subtract mode, the carry is equal to one and the most significant bit $S_{30}$ is equal to zero. Guard adder 100 will also receive a one through OR gate 108 from AND gate 116 if the system is in the subtract mode and the guard bit SMGRD is one. Round adder 114 may receive a one through OR gate 112 if, when line 92 carries a one, the system is in the subtract mode, the carry is a zero and the most significant bit SM30 is also a zero. The second input to round adder 114 is the round bit SMRND. The carry input to round adder 114 is provided by OR gate 118 when either the most significant bit $S_{30}$ is zero or the carry is a one. An additional adder, the sticky adder, may be provided as in prior art devices, but does not form a part of this invention. The sticky bit applies to the condition when the bits to be discarded are neither less than one-half the radix nor more than one-half the radix, but are exactly one-half the radix. In that case, there may be used any of the various approaches set forth in the article "A Proposed Standard for Binary Floating-Point Arithmetic", IEEE Task P754 Computer, Page 51, March 1981.

Figure 4:
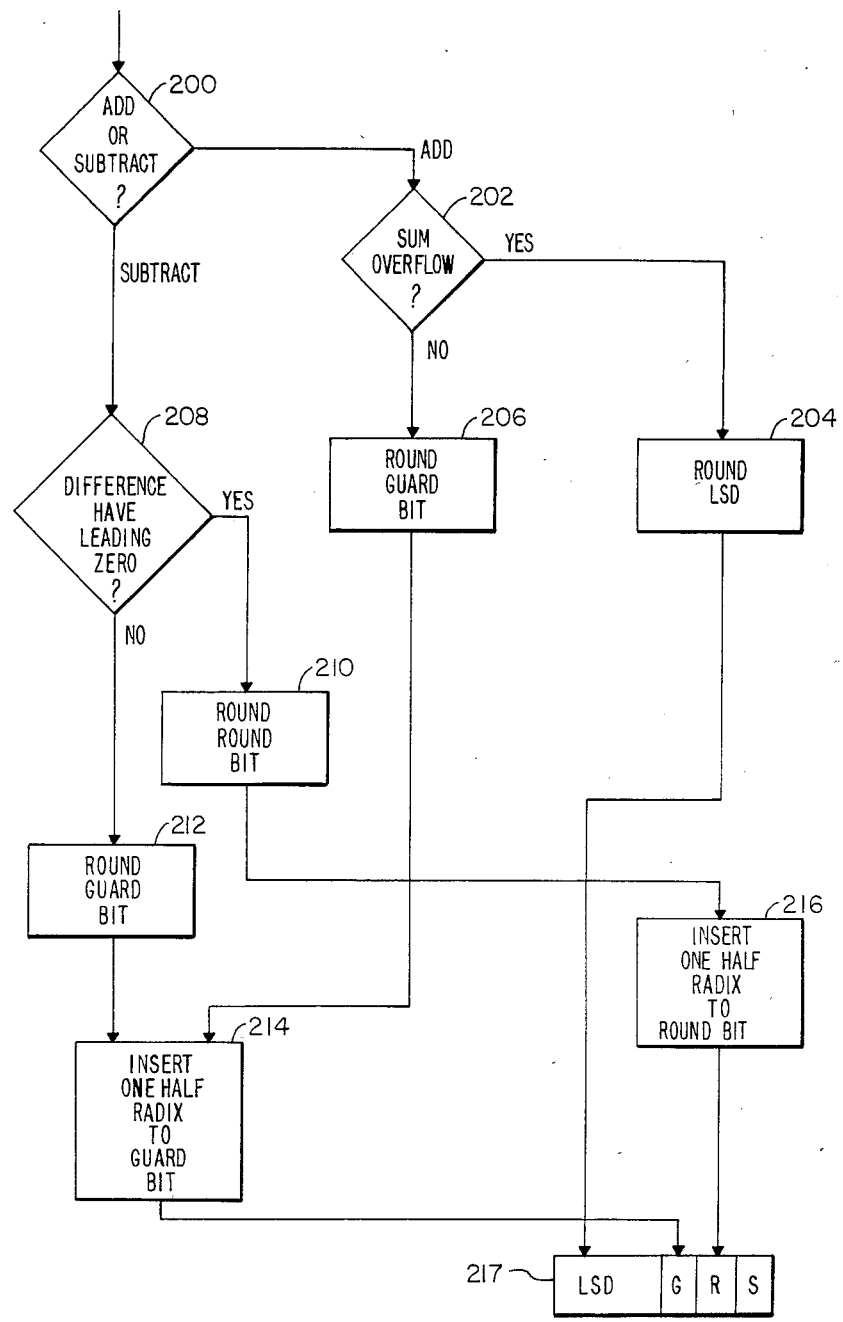
FIG. 4 is a flow chart of the floating point arithmetic method with rounding anticipation according to this invention.

In carrying out the method of this invention, there is first raised the question of whether the arithmetic operation will be an addition or a subtraction step 200, FIG. 4. If it is an addition, then the question is asked as to whether the sum will overflow in step 202. If the answer the affirmative, the LSD bit is rounded in step 204. If the answer is negative, the guard bit is rounded in step 206. If the system is to operate in the subtract mode, the question is then asked as the whether the difference will have a leading zero in step 208. If the answer is affirmative then the round bit is rounded in step 210. If the answer is negative the guard bit is rounded in step 212. In either case, if the guard bit is to be rounded then a value of one-half of the radix is inserted in the guard bit in step 214. If the round digit is to be rounded, then one-half the radix is inserted there in step 216. If the LSD is to be rounded, the carry into the LSD adder is forced to a one in step 217.

Other embodiments will occur to those skilled in the art and are within the following claims:

What is claimed is:

1. A floating point arithmetic system with rounding anticipation comprising:
   an arithmetic unit for arithmetically combining two mantissas;
   a carry circuit for determining whether the sum will overflow upon the addition of two mantissas, and whether the difference will have a leading zero upon the subtraction of two mantissas; the subtrahend in subtraction and the augend in addition including guard, round and sticky digits;
   a rounding circuit, responsive to the carry circuit, for designating for rounding the least significant digit of the sum when the sum will overflow and for designating for rounding the guard digit of the sum when the sum will not overflow; and for designating for rounding the round digit of the difference when the difference will have a leading zero and for designating for rounding the guard digit of the difference when the difference will not have a leading zero; and
   means, responsive to said rounding circuit, for introducing to said arithmetic unit at the designated digit during the arithmetic combining of the two manissas an amount equal to one half the radix to effect the rounding during the arithemtic operation.

2. The system of claim 1 in which said arithmetic unit includes adder means for performing adding and subtracting operations.

3. The system of claim 2 in which said carry circuit includes a carry generate/propagate bridge for anticipatorily determining whether the sum will overflow upon the addition of two mantissas.

4. The system of claim 1 in which said carry circuit includes a rounding anticipation adder for anticipatorily determining whether the difference will have a leading zero when the most significant digit of the subtrahend mantissa has a leading zero.

5. The system of claim 4 in which said rounding anticipation adder includes means for setting the most significant digit of the subtrahend to one, complementing the most significant digit of the subtrahend, and adding the complement to the most significant digit of the minuend.

6. The system of claim 1 in which said rounding circuit includes a round determination circuit for determining whether the guard, round and sticky digits are greater than one half the radix.

7. The system of claim 1 in which said rounding circuit includes an anticipation addition rounding circuit for placing one half the radix into the least significant digit of the arithmetic unit if an overflow will occur and adding one half the radix to the guard digit if an overflow will not occur.

8. The system of claim 1 in which said rounding circuit includes an anticipation subtraction rounding circuit for adding one half of the radix to the guard digit if there is no leading zero in the difference and adding one half of the radix to the round digit if there is a leading zero in the difference.

9. The system of claim 1 in which said means for introducing includes a guard digit adder circuit and a round digit adder circuit.

10. A method of rounding anticipation for a floating point arithmetic system comprising:

determining whether the sum will overflow upon the addition of two mantissas;

determining whether the difference between two mantissas will have a leading zero upon the subtraction of two mantissas;

designating for rounding the least significant digit of the sum when the sum will overflow;

designating for rounding the guard digit of the sum when the sum will not overflow;

designating for rounding the round digit of the difference when the difference will have a leading zero;

designating for rounding the guard digit of the difference when the difference will not have a leading zero;

arithmetically combining the two mantissas; and introducing to an arithmetic circuit at the designated digit during the arithmetic combining of the two mantissas an amount equal to one half the radix to effect the rounding during the arithmetic operation.

* * * * *